(12) United States Patent
Evans

(10) Patent No.: US 7,025,374 B2
(45) Date of Patent: Apr. 11, 2006

(54) AIRBAG COVER AND TEAR SEAM

(75) Inventor: Gregg Stoutenburg Evans, Windsor (CA)

(73) Assignee: Intertec Systems, Troy, MI (US)

( * ) Notice: Subject to any disclaimer, the term of this patent is extended or adjusted under 35 U.S.C. 154(b) by 11 days.

(21) Appl. No.: 10/613,265

(22) Filed: Jul. 3, 2003

(65) Prior Publication Data

US 2005/0001410 A1    Jan. 6, 2005

(51) Int. Cl.
*B60R 21/20* (2006.01)

(52) U.S. Cl. .................... 280/728.3; 280/731

(58) Field of Classification Search ............ 280/728.1, 280/728.2, 728.3, 730.1, 730.2, 731, 732
See application file for complete search history.

(56) References Cited

U.S. PATENT DOCUMENTS

| | | | | |
|---|---|---|---|---|
| 4,148,503 A | * | 4/1979 | Shiratori et al. | 280/731 |
| 4,334,699 A | * | 6/1982 | Patzelt et al. | 280/731 |
| 4,852,907 A | * | 8/1989 | Shiraki et al. | 280/731 |
| 5,013,064 A | * | 5/1991 | Miller et al. | 280/730.1 |
| 5,069,477 A | * | 12/1991 | Shiraki | 280/732 |
| 5,288,103 A | | 2/1994 | Parker et al. | |
| 5,378,014 A | * | 1/1995 | Cooper | 280/728.3 |
| 5,451,075 A | * | 9/1995 | Parker et al. | 280/728.3 |
| 5,484,273 A | | 1/1996 | Parker et al. | |
| 5,577,767 A | * | 11/1996 | Nemoto | 280/731 |
| 5,845,929 A | * | 12/1998 | Schlett et al. | 280/728.3 |
| 5,957,484 A | | 9/1999 | Levine et al. | |
| 6,139,049 A | * | 10/2000 | Gallagher | 280/728.3 |
| 6,168,189 B1 | | 1/2001 | Dennis | |
| 6,753,057 B1 | * | 6/2004 | Gardner, Jr. | 428/43 |

* cited by examiner

*Primary Examiner*—Paul N. Dickson
*Assistant Examiner*—Toan C. To
(74) *Attorney, Agent, or Firm*—Dykema Gossett PLLC

(57) ABSTRACT

This invention relates to the field of airbag covers such as are used in the interior of vehicles, and more specifically to an airbag cover having a novel tear seam. The tear seam is adapted to be located over a pair of deployment doors which are located behind the airbag cover. According to one embodiment, the tear seam includes a transverse segment having a width adapted to extend beyond the perimeter of the underlying deployment door. The tear seem also includes a first end segment and a second end segment. The transverse segment extends between and intersects each of the first end segment and the second end segment at locations distal from the perimeter of the underlying airbag door. The first end segment and second end segment each include at least one convex segment proximal the intersection of the first end segment with the transverse segment. Each convex segment is further adapted to be substantially perpendicular to a deployment induced stress pattern in the airbag cover.

13 Claims, 2 Drawing Sheets

AIRBAG COVER AND TEAR SEAM

FIELD OF INVENTION

This invention relates to the field of airbag covers such as are used in the interior of vehicles, and more specifically to an airbag cover having a novel tear seam.

BACKGROUND

Airbags are typically mounted in housings within a steering wheel, or instrument panel, or other structure in the interior of a vehicle. The airbag is typically concealed behind a set of deployment doors and an airbag cover material. The interior mounting arrangement requires that the airbag cover be designed to satisfy both aesthetic and functional requirements. The airbag cover and tear seam should protect against fatigue, tampering and accidental damage and must satisfy the long term effects of weathering due to exposure to heat and sun. In addition, an aesthetic appearance may be a factor for the interior design of the vehicle. The airbag cover material is typically formed from plastic materials including thermoplastic materials.

Importantly, the airbag cover must be adapted to allow the airbag to deploy through the cover material. To this end, airbag covers typically include a tear seam that is of a reduced strength relative to the surrounding portions of the airbag cover. It is the tear seam that ruptures upon deployment of the airbag as the tear seam defines an area having a tensile strength that is lower than the surrounding portions of the airbag cover, and provides a weakened place in the airbag cover that allows a deploying airbag to break through. The tear seem may be formed during a molding process in producing the airbag cover, or by laser scoring as is known in the art. The tear seam may be visible as an indented line on the outside surface of the airbag cover, or may be hidden from view on the reverse side of the airbag cover so that it is not visible to the occupant of the vehicle.

Although the tensile strength of the tear seam is weaker than the remaining area of the airbag cover, the tearing of the tear seam is not easy to control under deployment conditions. Neither the rate of tearing of the tear seam nor the location of the initial tear are easily controllable. As a result, efforts to develop airbag covers continue, and a variety of attempts have been made to develop a tear seam configuration that will support uniform deployment of the airbag.

SUMMARY OF THE INVENTION

This invention relates to the field of airbag covers such as are used in the interior of vehicles, and more specifically to an airbag cover having a novel tear seam. The present invention provides for a tear seam configuration that, among other things, better controls the tearing of the tear seam under initial deployment forces of an airbag. The present invention promotes uniform tearing of the tear seam, promotes earlier tearing of the tear seam, and promotes uniform deployment of the airbag.

The tear seam of the present invention is adapted to be located over a pair of deployment doors which are located behind the airbag cover. When the force of the airbag pushes open the deployment doors, the deployment forces act on the airbag cover imparting a deployment induced stress pattern in the airbag cover, causing the cover to tear along the tear seam.

According to one embodiment, the tear seam includes a transverse segment having a width adapted to extend beyond the perimeter of the underlying airbag door. The tear seem also includes a first end segment and a second end segment opposing one another. The first end segment and second end segment are joined to one another by the transverse segment. The transverse segment extends between and intersects each of the first end segment and the second end segment at locations distal from the perimeter of the underlying airbag door. The extended width of the transverse segment, allows for improved placement of the first end segment and second end segment relative to the stress pattern induced in the airbag cover during deployment.

The first end segment and second end segment may each include at least one convex segment proximal the intersection of the end segment with the transverse segment. Each convex segment is further adapted to be substantially perpendicular to a deployment induced stress pattern in the airbag cover.

The present invention promotes uniform tearing of the tear seam, promotes earlier tearing of the tear seam, and promotes uniform deployment of the airbag. Other aspects of the present invention will become apparent to those skilled in the art in light of the following detailed specification.

BRIEF DESCRIPTION OF DRAWINGS OF THE INVENTION

Exemplary embodiments of the present invention are described with reference to the appended drawings.

DETAILED DESCRIPTION OF THE INVENTION

This invention relates to the field of airbag covers such as are used in the interior of vehicles. More specifically, this invention relates to an airbag cover having a novel tear seam. The tear seam configuration of the present invention provides, among other things, better control of the tearing of the tear seam under initial deployment forces of an airbag. The present invention promotes uniform tearing of the tear seam, promotes earlier tearing of the tear seam, and promotes uniform deployment of the airbag.

Figure 1:
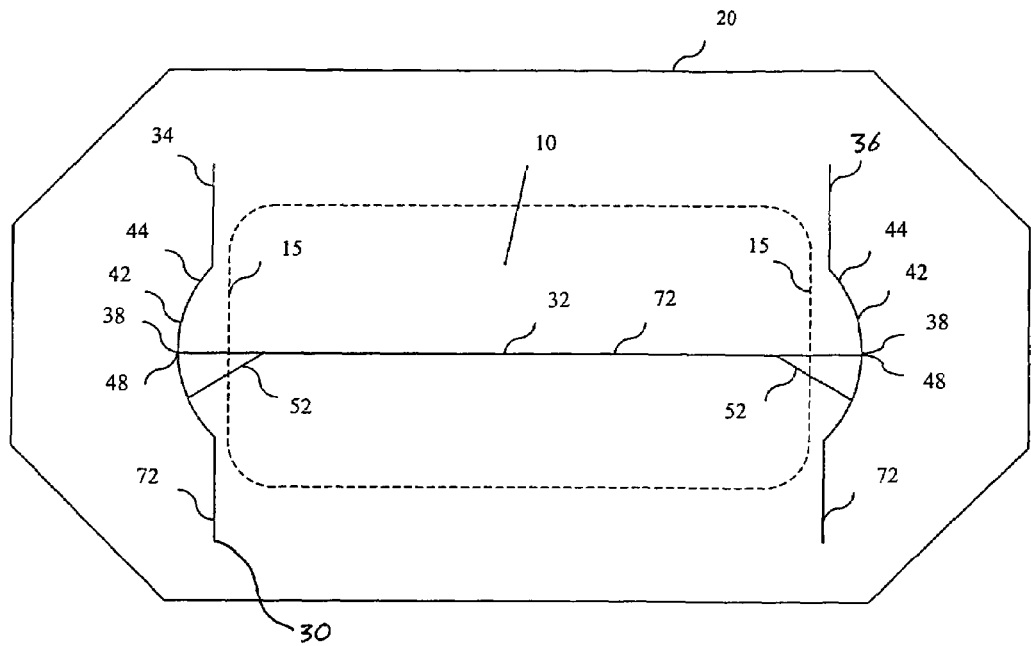
FIG. 1 is a front partial view of an embodiment of an airbag cover having a tear seam according to the present invention.

FIG. 1 illustrates an embodiment of a front view of an airbag cover 20 having a tear seam 30 according to the present invention. The tear seam 30 has an extended transverse segment 32, a first end segment 34, and a second end segment 36. Each end segment 34, 36 includes at least one convex segment 42 proximal the intersection 38 of the respective end segment 34, 36 with the transverse segment 32. As shown in this figure, the tear seam 30 is adapted to be located over a pair of deployment doors 10 which are located behind the airbag cover 20. When the force of the airbag pushes open the deployment doors 10, the deployment forces act on the airbag cover 20 imparting a deployment induced stress pattern in the airbag cover 20, causing the cover 20 to tear along the tear seam 30. In this figure, only a portion of the airbag cover 20 is shown. The airbag cover 20 may take a variety of shapes suitable for a given application.

The tear seam 30 of this embodiment includes a transverse segment 32 having a width adapted to extend beyond the perimeter 15 of the underlying airbag door 10. The tear seam 30 also includes a first end segment 34 and a second end segment 36 wherein each end segment 34, 36 opposes the other. The first end segment 34 and second end segment 36 are joined to one another by the transverse segment 32. As shown in this figure, the transverse segment 32 extends between and intersects each of the first end segment 34 and the second end segment 36 at locations distal 38 from the perimeter 15 of the underlying airbag door 10. The extended width of the transverse segment 32, allows for improved placement of the first end segment 34 and second end segment 36 relative to the stress pattern induced in the airbag cover 20 during initial deployment.

The first end segment 34 and second end segment 36 may each include at least one convex segment 42 proximal the intersection 38 of the respective end segment with the transverse segment 32. Each convex segment 42 is further adapted to be substantially perpendicular to a deployment induced stress pattern in the airbag cover 20. In the present embodiment, the at least one convex segment 42 is substantially symmetric about the intersection 38 with the transverse segment 32.

According to one embodiment, the at least one convex segment 42 takes the form of a single convex segment 44 having an outermost point 48, distal from the perimeter 15 of the underlying deployment doors, that corresponds to the point of intersection 38 with the transverse segment 32. This assists in orienting the tear seam 30 to be substantially perpendicular to a deployment induced stress pattern in the airbag cover 20, improving the uniformity and earlier tearing of the tear seam 30. According to one embodiment, the single convex segment 44 may take the form of an arc defined by a substantially uniform arc radius 52. Alternatively the single convex segment 44 may define a substantially parabolic shape. While these shapes are provided by way of example to illustrate shapes substantially perpendicular to a set of understood deployment induced stress patterns in the airbag cover 20, they are not intended to limit the scope of the invention. The extended width of the transverse segment 32, and the convex segments 60, 64 of each end segment 34, 36 proximal the intersection 38 of each end segment 34, 36 with the transverse segment 32, combine to further improve placement of each end segment 34, 36 relative to the deployment induced stress pattern in the airbag cover 20, and to better induce tears that initiate in the transverse segment 32 to follow the end segments 32, 34 of the tear seam 30.

Figure 2:
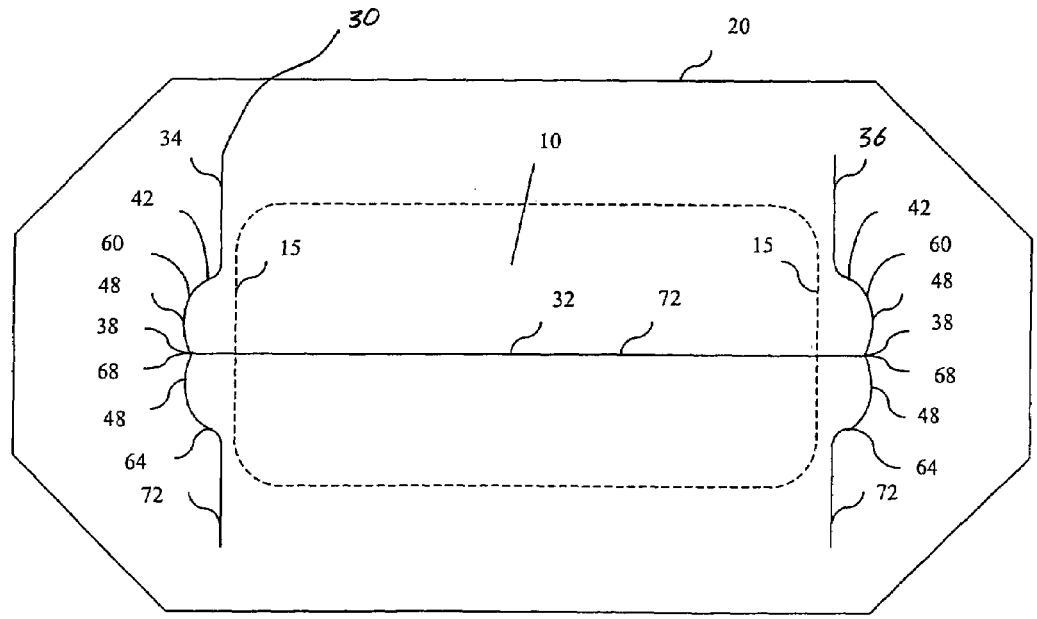
FIG. 2 is a front partial view of an embodiment of an airbag cover having a tear seam according to the present invention.

FIG. 2 illustrates an embodiment of a front view of an airbag cover 20 having a tear seam 30 according to the present invention. The tear seam 30 has an extended transverse segment 32, a first end segment 34, and a second end segment 36. Each end segment 34, 36 includes two convex segments 60, 64 proximal the intersection 38 of the respective end segment 34, 36 with the transverse segment 32. As shown in this figure, the tear seam 30 is adapted to be located over a pair of deployment doors 10 which are located behind the airbag cover 20. When the force of the airbag pushes open the deployment doors 10, the deployment forces act on the airbag cover 20 imparting a deployment induced stress pattern in the airbag cover 20, causing the cover 20 to tear along the tear seam 30. In this figure, only a portion of the airbag cover 20 is shown. The airbag cover 20 may take a variety of shapes suitable for a given application.

The tear seam 30 of this embodiment includes a transverse segment 32 having a width adapted to extend beyond the perimeter 15 of the underlying airbag doors 10. The tear seam 30 also includes a first end segment 34 and a second end segment 36 wherein each end segment 34, 36 opposes the other. The first end segment 34 and second end segment 36 are joined to one another by the transverse segment 32. As shown in this figure, the transverse segment 32 extends between, and intersects each of the first end segment 34 and the second end segment 36 at locations distal 38 from the perimeter 15 of the underlying airbag door 10. The extended width of the transverse segment 32, allows for improved placement of the first end segment 34 and second end segment 36 relative to the deployment induced stress pattern in the airbag cover 20.

The first end segment 34 and second end segment 36 may each include two convex segments 60, 64 proximal the intersection 38 of the first end segment 34 with the transverse segment 32. Each convex segment 60, 64 is further adapted to be substantially perpendicular to a deployment induced stress pattern in the airbag cover 20. In the present embodiment, the two convex segments 60, 64 are substantially symmetric about the intersection 38 with the transverse segment 32.

According to the present embodiment, the two convex segments 60, 64 take the form of an upper convex segment 60 and a lower convex segment 64, each meeting the other to form a valley 68 at the intersection 38 of the respective end segment 34, 36 with the transverse segment 32. The extended width of the transverse segment 32, the convex segments 60, 64 of each end segment 32, 34, and the valley 68 at the intersection 38 of each end segment 34, 36 with the transverse segment 32, combine to further improve placement of each end segment 34, 36 relative to the deployment induced stress pattern in the airbag cover 20, and to better induce tears that initiate in the transverse segment 32 to follow the end segments 32, 34 of the tear seam 30.

Referring to FIG. 1 and FIG. 2, the transverse segment 32 may be of the type formed from a continuous uniform laser score 72. In addition, the first end segment 34 and second end segment 36 may be of the type formed from a continuous uniform laser score 72.

Figure 3:
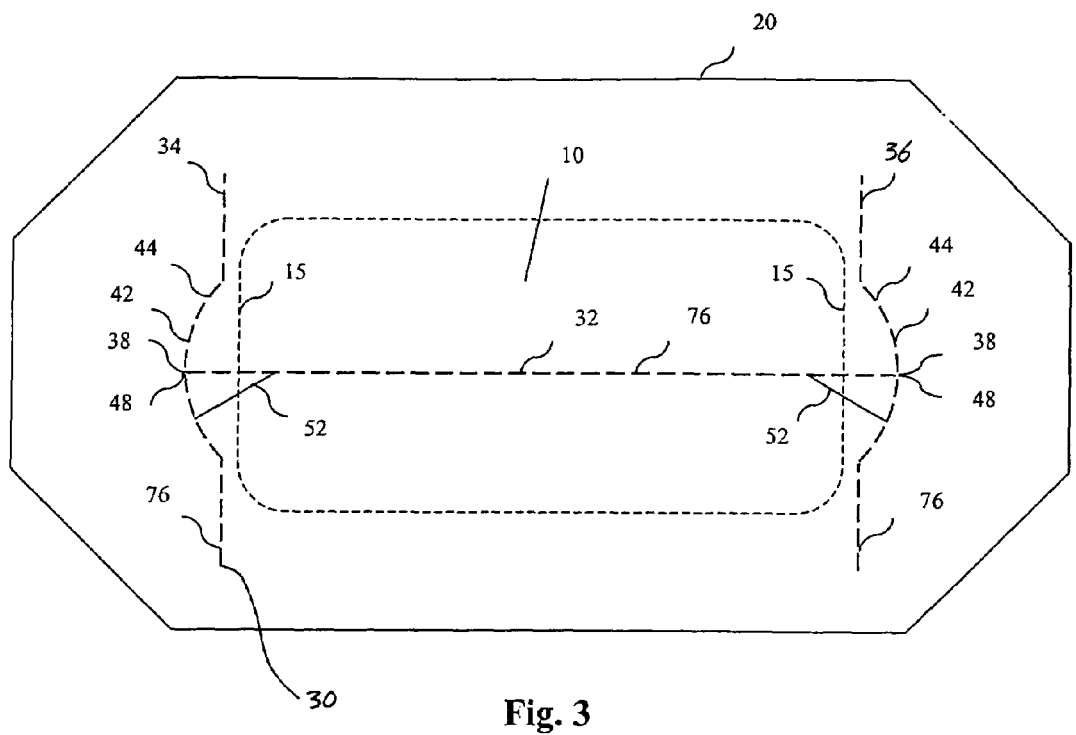
FIG. 3 is a front partial view of an embodiment of an airbag cover having a tear seam according to the present invention.
Figure 4:
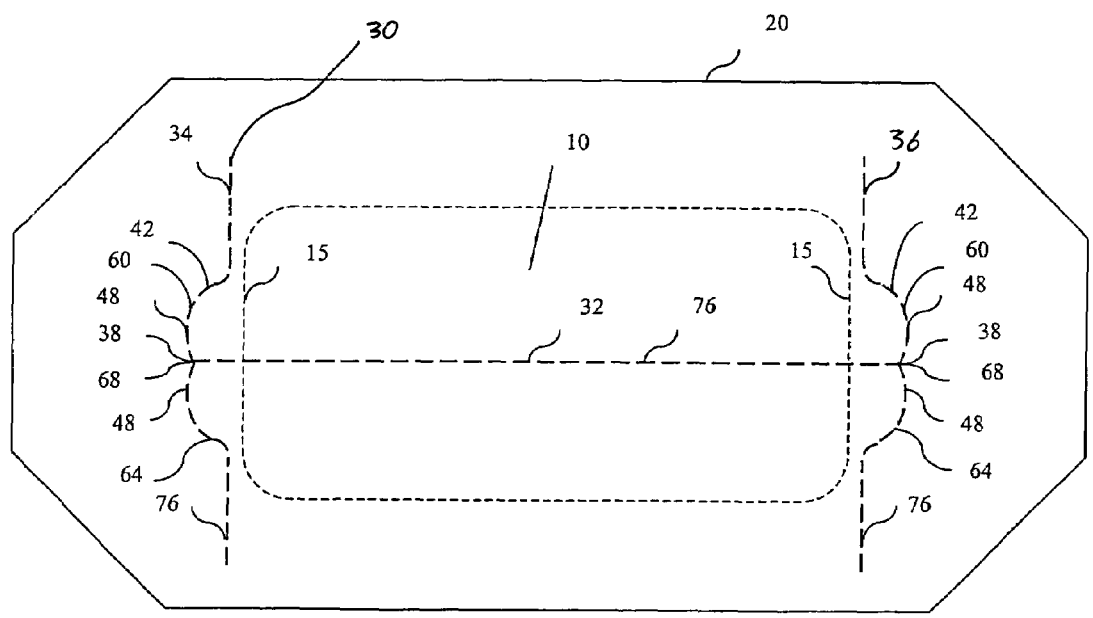
FIG. 4 is a front partial view of an embodiment of an airbag cover having a tear seam according to the present invention.

Referring to FIG. 3 and FIG. 4, the transverse segment 32 may be of the type formed from a series of multiple laser score segments 76 approximating the continuous configuration shown in FIG. 1 and FIG. 2. In addition, the first end segment 34 and second end segment 36 may similarly be of the type formed from a series of multiple laser score segments 76 approximating the continuous configuration. In these figures, only a portion of the airbag cover 20 is shown. The airbag cover 20 may take a variety of shapes suitable for a given application.

The invention provided herein is suitable for use throughout a vehicle, including without limitation as a tear pattern in an airbag cover utilized with front driver and passenger airbag assemblies, rear passenger airbag assemblies, or side or curtain airbag assemblies. The features described herein, combine to further improve placement of the airbag cover tear seam relative to the deployment induced stress pattern in the airbag cover, and to better induce tears that initiate in the transverse segment to follow the end segments of the tear seam.

While the invention has been described in connection with specific embodiments and applications, no intention to restrict the invention to the examples shown is contemplated. It will be apparent to those skilled in the art that the above methods may incorporate changes and modifications without departing from the general scope of this invention. It is intended to include all such modifications and alterations in so far as they come within the scope of the appended claims or equivalents thereof.

What is claimed is:

1. An airbag cover having a tear seam, said tear seam comprising:
   a transverse segment having a width extending beyond a perimeter of an underlying airbag door; and
   a first end segment and a second end segment opposing one another, the transverse segment extending between and intersecting each of the first end segment and the second end segment at locations distal from the perimeter of the underlying airbag door,
   wherein:
   the first end segment and second end segment, each including at least one convex segment proximal the intersection of the first end segment with the transverse segment,
   each convex segment adapted to be substantially perpendicular to a deployment induced stress pattern in the airbag covering,
   the at least one convex segment is substantially symmetric about the intersection with the transverse segment,
   the at least one convex segment of the first end segment comprises an upper convex segment and a lower convex segment meeting to form a valley at the intersection of the first end segment with the transverse segment, the valley is formed such that an outermost point of the at least one convex segment of the first end segment is disposed at a greater distance from the intersection of the first end segment with the transverse segment, and
   the at least one convex segment of the second end segment comprises an upper convex segment and a lower convex segment meeting to form a valley at the intersection of the second end segment with the transverse segment, the valley is formed such that an outermost point of the at least one convex segment of the second end segment is disposed at a greater distance from the intersection of the second end segment with the transverse segment.

2. The airbag cover of claim 1 wherein:
   the at least one convex segment comprises a single convex segment in the form of an arc defined by a substantially uniform arc radius.

3. The airbag cover of claim 1 wherein:
   the at least one convex segment comprises a single convex segment defined by a substantially parabolic shape.

4. The airbag cover of claim 1 wherein:
   the transverse segment being formed from a continuous uniform laser score.

5. The airbag cover of claim 1 wherein:
   the first end segment and second end segment being formed from a continuous uniform laser score.

6. The airbag cover of claim 1 wherein:
   the transverse segment being formed from a series of multiple laser score segments.

7. The airbag cover of claim 1 wherein:
   the first end segment and second end segment being formed from a series of multiple laser score segments.

8. An airbag cover having a tear seam, said tear seam comprising:
   a transverse segment having a width extending beyond a perimeter of an underlying airbag door; and
   a first end segment and a second end segment opposing one another, the transverse segment extending between and intersecting each of the first end segment and the second end segment at locations distal from the perimeter of the underlying airbag door,
   wherein the first end segment and second end segment, each including at least one convex segment proximal the intersection of the first end segment with the transverse segment, each convex segment adapted to be substantially perpendicular to a deployment induced stress pattern in the airbag covering, the at least one convex segment of the first end segment comprises an upper convex segment and a lower convex segment meeting to form a valley at the intersection of the first end segment with the transverse segment, the at least one convex segment of the second end segment comprises an upper convex segment and a lower convex segment meeting to form a valley at the intersection of the second end segment with the transverse segment, and the valleys are formed such that respective outermost points of the at least one convex segment of the first and second end segments are disposed at a greater distance from the intersection of the first and second end segments with the transverse segment.

9. The airbag cover of claim 8 wherein:
   the at least one convex segment is substantially symmetric about the intersection with the transverse segment.

10. The airbag cover of claim 8 wherein:
    the transverse segment being formed from a continuous uniform laser score.

11. The airbag cover of claim 8 wherein:
    the first end segment and second end segment being formed from a continuous uniform laser score.

12. The airbag cover of claim 8 wherein:
    the transverse segment being formed from a series of multiple laser score segments.

13. The airbag cover of claim 8 wherein:
    the first end segment and second end segment being formed from a series of multiple laser score segments.

* * * * *